US012136184B2

(12) United States Patent
Kappel (10) Patent No.: US 12,136,184 B2
(45) Date of Patent: Nov. 5, 2024

(54) CHANGING THE SIZE OF IMAGES BY MEANS OF A NEURAL NETWORK

(71) Applicant: LEICA MICROSYSTEMS CMS GMBH, Wetzlar (DE)

(72) Inventor: Constantin Kappel, Schriesheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 664 days.

(21) Appl. No.: 17/413,590

(22) PCT Filed: Dec. 11, 2019

(86) PCT No.: PCT/EP2019/084550
§ 371 (c)(1),
(2) Date: Nov. 10, 2021

(87) PCT Pub. No.: WO2020/126719
PCT Pub. Date: Jun. 25, 2020

(65) Prior Publication Data
US 2022/0343463 A1  Oct. 27, 2022

(30) Foreign Application Priority Data
Dec. 19, 2018 (DE) ............ 10 2018 222 300.9

(51) Int. Cl.
G06T 3/4046 (2024.01)
G06T 3/4053 (2024.01)
G06T 5/50 (2006.01)
G06T 5/73 (2024.01)

(52) U.S. Cl.
CPC .......... *G06T 3/4046* (2013.01); *G06T 3/4053* (2013.01); *G06T 5/50* (2013.01); *G06T 5/73* (2024.01); *G06T 2207/20084* (2013.01)

(58) Field of Classification Search
CPC ..... G06T 3/4046; G06T 3/4053; G06T 5/003; G06T 5/50; G06T 2207/20084; G06N 3/045; G06N 3/084; H04N 1/393
See application file for complete search history.

(56) References Cited

U.S. PATENT DOCUMENTS 6,480,619 B1 * 11/2002 Vuylsteke ............. G06T 3/4007
382/299
2009/0189900 A1 * 7/2009 Furukawa ............. G06T 3/4069
345/428

(Continued)

OTHER PUBLICATIONS

Ouyang, W., et al.: "Deep learning massively accelerates super-resolution localization microscopy," In: Nature biotechnology, Apr. 16, 2018, vol. 36., Nr. 5, pp. 460-468, Nature, UK.

(Continued)

*Primary Examiner* — Van D Huynh
(74) *Attorney, Agent, or Firm* — LEYDIG, VOIT & MAYER, LTD.

(57) ABSTRACT

An apparatus for scaling images includes one or more processors and one or more computer-readable storage media on which computer-executable instructions are stored. The computer-executable instructions, upon being executed by the one or more processors, provide for execution of the following steps: capturing one or more first images by an imaging and/or image recording system, wherein the one or more captured first images are related to a first resolution; and generating, by a neural network, one or more corresponding second images based on one or more captured first images, wherein the one or more second images are related to a second resolution, the first resolution differing from the second resolution.

12 Claims, 5 Drawing Sheets

(56) References Cited

U.S. PATENT DOCUMENTS

| | | | | |
|---|---|---|---|---|
| 2009/0296203 | A1* | 12/2009 | Kojima | G02B 21/365 |
| | | | | 359/368 |
| 2011/0235866 | A1* | 9/2011 | Endo | G06T 7/254 |
| | | | | 382/107 |
| 2012/0257038 | A1* | 10/2012 | Raicu | G02B 21/002 |
| | | | | 356/300 |
| 2018/0075581 | A1 | 3/2018 | Shi et al. | |
| 2018/0293707 | A1 | 10/2018 | El-Khamy et al. | |
| 2018/0342044 | A1* | 11/2018 | Lutz | H04N 7/18 |
| 2019/0236781 | A1* | 8/2019 | Shimizu | G06T 7/0014 |
| 2020/0111194 | A1* | 4/2020 | Wang | G06N 3/047 |
| 2021/0217190 | A1* | 7/2021 | Engel | H04N 23/56 |

OTHER PUBLICATIONS

Wikipedia, ,,Binning Oct. 27, 2018, Wikipedia, US, pp. 1-4, https://de.wikipedia.org/w/index.php?title=Binning&oldid=182209493.

Wikipedia, ,,Image scaling Nov. 17, 2018, Wikipedia, US, pp. 1-6, https://en.wikipedia.org/w/index.php?title=Image_scaling&oldid=869209249#Algorithms.

Rivenson, Yair et al. "Toward a Thinking Microscope: Deep Learning in Optical Microscopy and Image Reconstruction," Arxiv.org, US, May 23, 2018, XP081139811, pp. 1-11.

Rivenson, Yair et al. "Deep Learning Microscopy," Arxiv.org, US, May 12, 2017, XP081276423, pp. 1-29.

Rivenson, Yair et al. "Deep Learning Enhanced Mobile-Phone Microscopy," Arxiv.org, US, Dec. 12, 2017, XP081303226, pp. 1-31.

Freedman, Gilad and Raanan Fattal, "Image and Video Upscaling from Local Self-Examples," in the journal ACM Transactions on Graphics (TOG) vol. 30 issue 2, (Apr. 2011), pp. 1-11, US.

Dai, D. et al. "Jointly Optimized Regressors for Image Super-resolution," in Computer Graphics Forum, vol. 34, pp. 95-104, Dec. 2015, John Wiley & Sons Ltd., US.

* cited by examiner

CHANGING THE SIZE OF IMAGES BY MEANS OF A NEURAL NETWORK

REFERENCE TO RELATED APPLICATIONS

This application is a U.S. National Phase application under 35 U.S.C. § 371 of International Application No. PCT/EP2019/084550, filed on Dec. 11, 2019, and claims benefit to German Patent Application No. DE 10 2018 222 300.9, filed on Dec. 19, 2018. The International Application was published in German on Jun. 25, 2020, as WO 2020/126719 A1 under PCT Article 21(2).

FIELD

The invention relates to a method and an apparatus for providing a neural network for scaling images.

A digital image with a certain resolution or pixel resolution may arise when recording an image with an image recording system, for example a digital camera. The digital image can be considered to be a number of columns (width) and lines (height) of a raster graphic. The image content in images is limited by the resolution or the overall number of pixels in an image. It may be advantageous to adapt or alter the size of an image for certain applications.

BACKGROUND

Existing systems scale images or change the size of an image with the aid of interpolation. If digital images are enlarged, it is necessary to calculate values for the image brightness of new pixels that are located between existing pixels. Within the scope of interpolation, the existing pixels are used as boundary values and the intermediate values in the pixel grid are calculated according to a set mathematical function. Known mathematical methods include bilinear, biquadratic or bicubic interpolation. However, all these methods for calculating new intermediate values only use image information from the one image present. Although the image arising as a result magnifies all image elements and objects in the image proportionally correctly, it does not reproduce new image details. As a result, no new image details, which could become visible in the case of a higher resolution recording of an object, become visible. Therefore, the image impression arising in the case of methods operating with interpolation appears washed out.

To circumvent this problem, relatively new processes from the prior art use processes based on internal image similarities, for example described by Freedman, G. and Fattal, R. in the journal ACM Transactions on Graphics (TOG) volume 30 issue 2, (April 2011) "*Image and Video Upscaling from Local Self-Examples*", or similarities with picture elements of external image pairs of low- and high-resolution images, as described by, e.g., D. Dai, R. Timofte, and L. Van Gool in Computer Graphics Forum, volume 34, pages 95-104 (2015), "*Jointly Optimized Regressors for Image Super-resolution*", in order to upscale images.

SUMMARY

In an embodiment, the present disclosure provides an apparatus for scaling images includes one or more processors and one or more computer-readable storage media on which computer-executable instructions are stored. The computer-executable instructions, upon being executed by the one or more processors, provide for execution of the following steps: capturing one or more first images by an imaging and/or image recording system, wherein the one or more captured first images are related to a first resolution; and generating, by a neural network, one or more corresponding second images based on one or more captured first images, wherein the one or more second images are related to a second resolution, the first resolution differing from the second resolution.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

The methods from the prior art exhibit quite a few disadvantages and problems. By way of example, these methods are frequently domain-specific and the scaling cannot readily be transferred to new fields of application with previously unknown objects in images. Moreover, existing microscopes or image capture systems use methods for upscaling images only as means for image post-processing. This restricts the utility of the upscaled images. Moreover, methods from the prior art can only seldom realize scaling factors of greater than 2.0.

Embodiments of the present invention provide improved means for scaling images.

Embodiments of the present invention solve the problems addressed above and achieve improved means for scaling images by way of an apparatus for scaling images. The apparatus according to an embodiment of the invention comprises one or more processors and one or more computer-readable storage media, wherein computer-executable instructions are stored on the one or more computer-readable storage media, said instructions, when executed by the one or more processors, causing one or more first images to be captured by means of an imaging and/or image recording system and a neural network to generate one or more corresponding second images on the basis of the one or more captured first images. The one or more captured first images are related to a first resolution and the one or more second images are related to a second resolution, which differs from the first resolution.

The method according to an embodiment of the invention comprises the steps of determining a multiplicity of image pairs and training a neural network on the basis of the determined multiplicity of image pairs, in such a way that the trained neural network outputs a second image when applied to a first image, with the resolution of the first image differing from the resolution of the second image, wherein the input images of the multiplicity of image pairs were captured by a first imaging and/or image recording system and target output images of the image pairs corresponding to the input images were captured by a second imaging and/or image recording system, and wherein the first imaging and/or image recording system differs from the second imaging and/or image recording system.

The method according to an embodiment of the invention and the apparatus according to an embodiment of the invention are advantageous in that intelligent scaling of digital images is facilitated by means of the related neural networks, e.g., within the meaning of deep learning, in real time or near real time during the recording of images. Moreover, the method according to an embodiment of the invention and the apparatus according to an embodiment of the invention facilitate an increase in a pixel resolution of a captured image. The missing image information can be generated by a neural network that was trained in advance using a multiplicity of images, for example several thousand images or even millions of images. Thus, the missing image information is not simply interpolated from the one image present but generated on the basis of learned image semantics. The use of a neural network generates an image which contains more image details and/or more image information than the originally recorded image. Consequently, the image generated by means of the neural network has more details than the originally recorded image. This can simplify the interpretation of the image by a human or an algorithm. Moreover, neural networks facilitate a better generalizability for previously unknown applications.

The method according to an embodiment of the invention and the apparatus according to an embodiment of the invention can each be improved further by way of specific configurations. Individual technical features of the configurations of the invention described below can be combined with one another and/or omitted as desired, provided the technical effect obtained by the omitted technical feature does not matter.

In one embodiment, the apparatus according to an embodiment of the invention is configured to directly apply the neural network to each of the one or more captured first images and only store the one or more second images. Memory can be saved by reducing the first resolution of the one or more captured first images prior to storage. Alternatively, the one or more first images captured by an image capture system, such as a microscope with a camera, a video camera, a microscope system, a microscope with a point scanner, a digital camera, a smartphone, a telescope, a measuring device or a computer with a camera, can be stored and the neural network can be applied to the one or more stored first images. Neural networks are advantageous in that images entered into the neural network pass through the latter only once. There is no need to solve an optimization problem in order to generate an upscaled image. Consequently, the higher resolution image can be calculated quickly and efficiently from the stored images with a lower resolution.

In embodiments, the one or more processors can comprise computing accelerators such as graphical processing units (GPUs), field-programmable gate arrays (FPGAs), Tensor-Flow processing units or tensor processing units (TPUs), application-specific integrated circuits (ASICs) specialized for machine learning (ML) and/or deep learning (DL) or at least one central processing unit (CPU). As a result, images can be processed quicker and image scaling can be part of the image recording process.

The apparatus according to an embodiment of the invention can furthermore be advantageously configured by virtue of the computer-executable instructions, when executed by the one or more processors, furthermore causing the imaging and/or image recording system to be set on the basis of the first resolution. Setting can comprise setting at least one of the following settings: a frame rate for capturing the one or more first images, a transfer rate of the one or more captured first images from the imaging and/or image recording system to a personal computer, the apparatus or a data memory, a binning, a pixel selection of all pixels of the imaging and/or image recording system for capturing the one or more first images, an exposure time, a scanning format or a pixel resolution for capturing the one or more first images, wherein the one or more first images comprise one or more scanned images, a scan frequency (e.g., a line scan frequency) of the imaging and/or image recording system, wherein the imaging and/or image recording system comprises a scanning imaging and/or image recording system, a numerical aperture, NA, of an optical system of the imaging and/or image recording system, and a luminous intensity of a light source of the imaging and/or image recording system. A further advantage is that, with a lower pixel resolution, for example fewer image lines in the case of a scanning point detector (scanner) or more binning in the case of an area detector of the image capture system, images can be recorded and subsequently be brought to a desired size. This facilitates high recording speed for measurement and/or use of a sample-sparing or small light dose during a recording.

In advantageous embodiments, the first resolution of the image capture system can be set. By way of example, setting the first resolution can comprise setting a binning and/or selecting a subset of pixels of the imaging and/or image recording system for capturing the one or more first images. By reducing the first resolution of the imaging and/or image recording system, the imaging and/or image recording system is configured to reduce an exposure time for the capture of the one or more first images by means of binning and/or selecting a subset of pixels, to reduce a luminous intensity of a light source of the imaging and/or image recording system by means of binning, to increase a transfer rate of the one or more first images by means of binning and/or selecting a subset of pixels, to increase a frame rate for capturing the one or more first images by means of binning and/or selecting a subset of pixels, to increase a maximum number of storable images or generate more memory for the one or more captured images by means of binning and/or selecting a subset of pixels, to increase a recording speed for capturing the one or more first images by means of binning and/or selecting a subset of pixels, and/or to store a greater number of the one or more captured first images by means of binning and/or selecting a subset of pixels. By way of example, scanning imaging and/or image recording systems can reduce the exposure time by selecting a subset of pixels since the number of scanning points is reduced, and hence the sample is exposed to light for a shorter period of time.

The apparatus according to an embodiment of the invention, which may be part of an image recording system such as a microscope for example, can be configured to reduce the recording time of a measurement if fewer image lines are scanned or fewer pixels are recorded, to reduce the memory for the image data if only smaller images are stored since the high-resolution images can be reconstructed, to reduce the light dose used to illuminate an object, and to increase the resolution of captured images.

In one embodiment of the method according to an embodiment of the invention, image pairs are captured for training the neural network with a second and a first imaging and/or image recording system, wherein the second imaging and/or image recording system is configured to capture images with a resolution that is higher than a resolution of the first imaging and/or image recording system. Upscaled images with the greater detail contrast can be generated by way of training with image pairs that have arisen using different techniques, for example diffraction-limited microscopy and nanoscopy with optical super-resolution. If the neural network was trained in one context with the one or more captured first images, image information can be generated semantically correctly in the one or more second images.

In embodiments, training the (first) neural network can comprise applying a second neural network. The second neural network can be applied as loss function for training of the first neural network. This facilitates improved training of the first neural network since a neural network as a loss function facilitates an accurate training which ensures that the output of the neural network equals a desired image. This is not ensured if an error in the output image is only calculated per pixel. Consequently, the output images are not treated as a set of independent pixels but are put into a semantic relationship.

In advantageous embodiments, the first neural network can be trained further (finely adjusted). This fine adjustment (also referred to as fine tuning below) can comprise training of only a part of the determined (first) neural network. In the process, one or more parameters of the determined neural network can remain unchangeable during the fine adjustment. The fine adjustment can be carried out on the basis of individual training data.

The present subject matter of embodiments of the invention are described in more detail below on the basis of exemplary drawings. The drawings show examples of advantageous configurations of embodiments of the invention.

Figure 1:
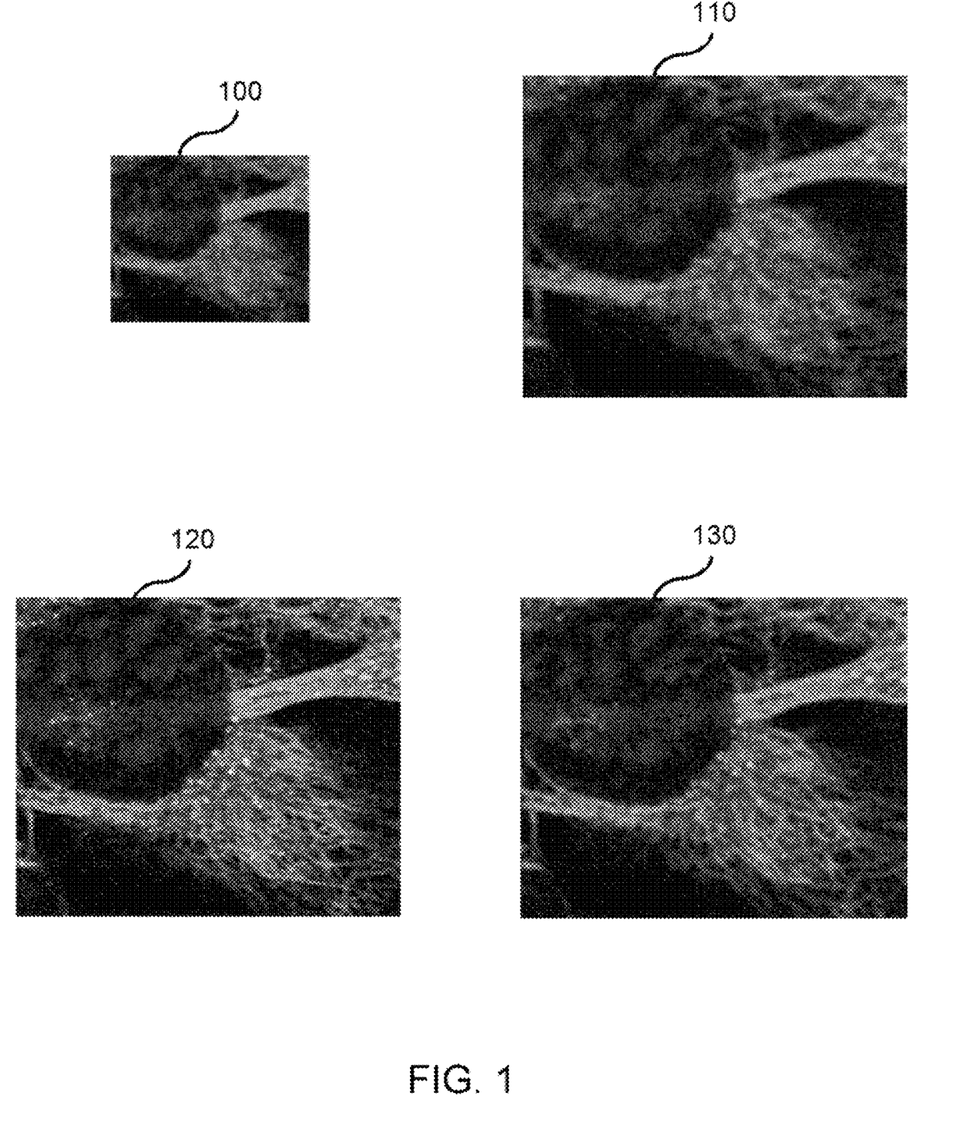
FIG. 1 shows images with different resolutions.

FIG. 1 shows an image 100 with a first (low) resolution, for example 73×75 pixels, and images 110, 120 and 130 with a second (high) resolution, for example 250×300 pixels. The images 100, 110, 120 and 130 show the same object, stained vertebrate cells. Images 100 and 120 may have been captured by the same imaging and/or image recording system, for example a microscope (Leica TCS SP 5). Alternatively, images 100 and 120 may have been captured by different image recording systems. The different resolution of images 100 and 120 leads to a difference in the information content of the two images, with the image 120 with the high resolution having an increased information content over the image 100 with the lower resolution. By way of example, more details of the same object can be identified in image 120 than in image 100. The low resolution with which the first image was recorded may be a maximum resolution of an image capture system for recording or a resolution of the image recording system which was set for a certain recording or certain conditions. By way of example, a higher maximum frame rate may be attained with a lower resolution. However, image information is lost as a result of the lower resolution.

It may be advantageous to upscale the image 100 in certain applications. Images 110 and 130 are upscaled images which were produced from the image 100. Image 110 is an image upscaled using bicubic interpolation and image 130 was generated with the aid of the method according to the invention for scaling images according to one embodiment. The resolution of the image 100 restricts the information content in the image 110 upscaled using bicubic interpolation since bicubic interpolation only smooths and does not add any new information. As can be seen in FIG. 1, when compared to the image 120 measured with high resolution, the image 130 upscaled with the aid of the method according to the invention supplies significantly better results than the interpolated image 110.

Figure 2:
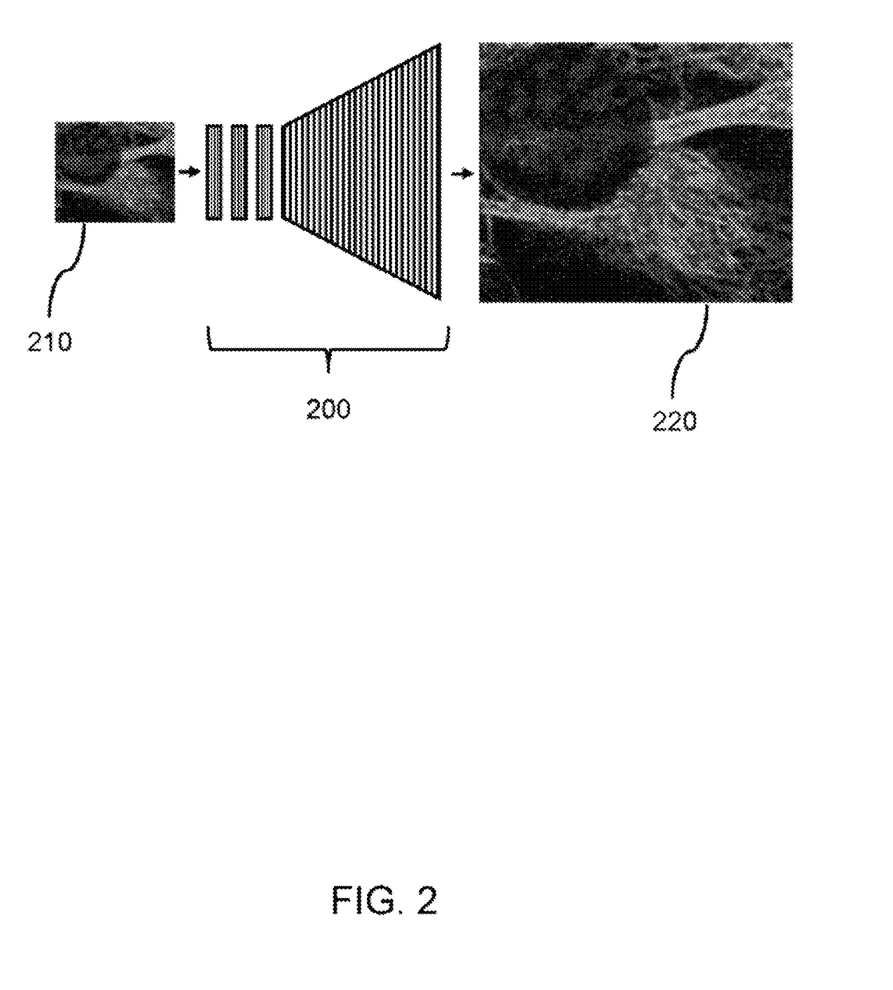
FIG. 2 shows a schematic illustration of a method according to the invention for scaling images by means of a neural network according to one embodiment.

FIG. 2 shows a schematic illustration of the functionality of a neural network 200 for scaling images. The neural network 200 is configured to alter the resolution of an image 210 by virtue of the neural network 200 generating an image 220 with an altered resolution. By way of example, the neural network 200 can output an image 220 with a resolution twice as large, four times as large or m/n-times as large as that of the input image 210 of the neural network, where m and n are natural numbers or positive integers. Individual dimensions of an image can be scaled in embodiments.

The input image 210 for the neural network 200 can comprise a first resolution. If the neural network 200 is applied to the image 210 or this image 210 is entered into the neural network 200, the neural network 200 can map the image 210 to the output image 220, with the number of pixels of the image 210 not necessarily corresponding to the number of pixels of the image 220. Thus, the image 210 can be upscaled or downscaled. In FIG. 2, the neural network 200 is configured to generate image 220 from an image 210, with the image 220 having a higher resolution and/or containing more image information than the input image 210. The neural network can be configured to generate missing image information in image 210 semantically correctly from the neural network. The neural network 200 may have been trained using training data which are contextually related to the captured images. The difference to conventional methods such as bicubic interpolation is that the generated image information does not only originate from the one image present but is generated taking account of learned image representations from a multiplicity of images. In this way, semantically correct image information not contained in the low-resolution image present is added.

The application of the neural network 200 differs from the training of the neural network 200 in terms of the data records used. During training, one or more first images are input into the neural network 200 and internal parameters of the neural network are adapted in such a way that the output images of the neural network 200 correspond to the best possible extent to target output images. During the application of the neural network, the image data run through the neural network 200 once, and the neural network 200 generates an output image as a prediction. Neural networks can represent results, with the latter having been learned by at least one deep learning process and/or at least one deep learning method. These neural networks condense knowledge collected in relation to a specific object ensemble in a suitable manner by automated learning, in such a way that a certain object can henceforth be carried out in automated fashion and with the highest quality.

Image 210 can be an image captured or recorded by an image capture system. In one embodiment, the captured image 210 can be preprocessed before it is entered into the neural network 200. The preprocessing can comprise an interpolation of the image 210, for example a bilinear, biquadratic or bicubic interpolation. By way of example, the image 210 may be interpolated to the desired output size of the neural network. This corresponds to the image size of the image 220.

The neural network can then be applied to the interpolated image and generates an output image, the output image and the interpolated image differing in terms of their information content, their detail contrast and/or their sharpness. By way of example, the information content, the detail contrast and/or the sharpness of the output image may be increased in comparison with the interpolated image. Alternatively, the preprocessing may also be part of the neural network.

Figure 3:
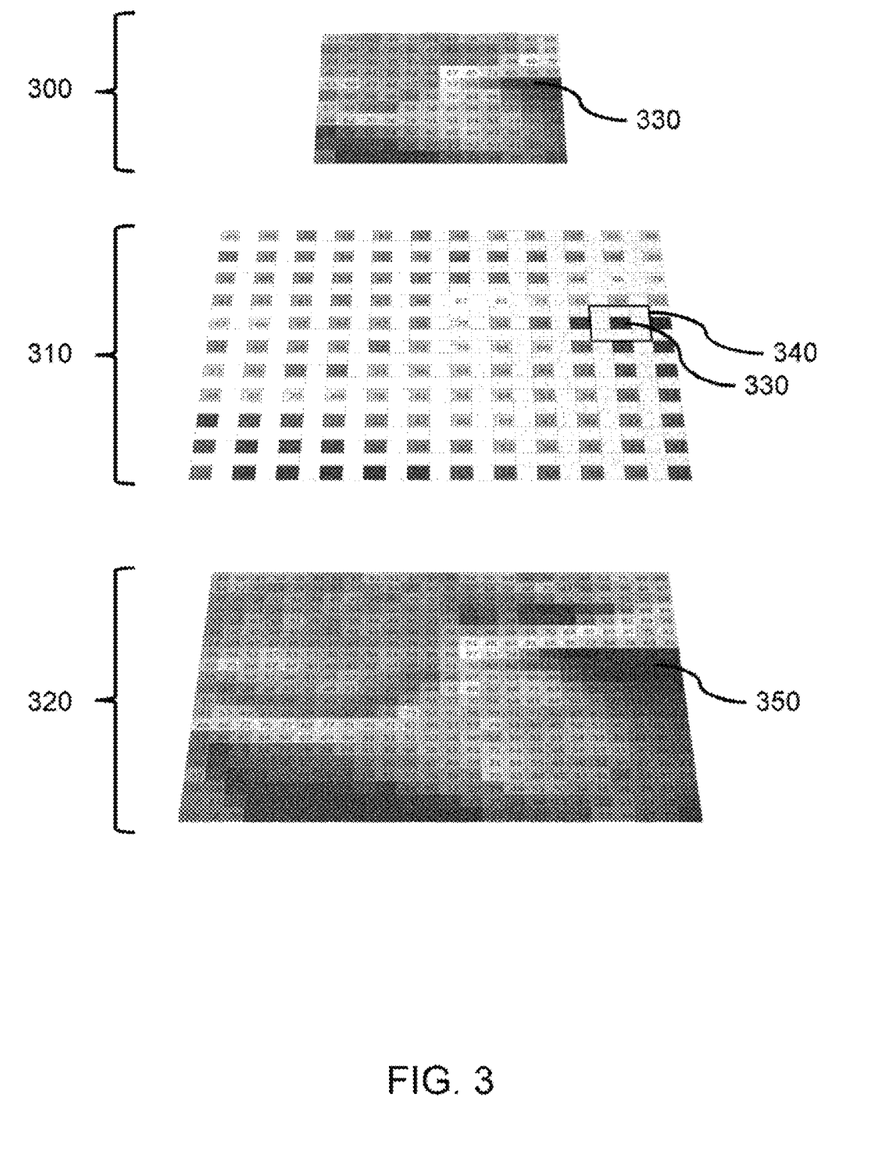
FIG. 3 shows a schematic illustration of a method according to the invention for scaling images by means of a neural network according to one embodiment.

FIG. 3 schematically illustrates the principle of upscaling. A first image 300 with a first (low) resolution of 11×12 pixels comprises a pixel 330 with a value 68. The first image 300 can be scanned and can be brought to a desired size. In the process, arising gaps can be filled with the pixel value of zero for example, and so a second image 310 which has the same resolution or size as the desired image 320 arises. A convolution matrix 340 can be applied to the image 310 in a next step. By way of example, the convolution matrix 340 has a size of 3×3 pixels in FIG. 3. The image 320 may arise by convolving the convolution matrix 340 with the image 310. This corresponds to an increment of approximately ½ when upscaling. The neural network for scaling images may have a multiplicity of layers, wherein the increment during the convolutions in the layers may have different sizes. By way of example, an increment of 1 in a convolution generates a new image with a size corresponding to the size of the input image, an increment of greater than 1 generates a new image with a smaller size than the size of the input image and an increment of less than 1 generates a new image with a larger size than that of the input image.

The parameters of the convolution matrix are learned by the neural network within training. When the neural network is applied to input images it can generate output images with a higher resolution, with missing image information from the input image being generated by the neural network. The neural network may learn hidden representations by training with a multiplicity of training images. Thus, semantically correct images with a higher resolution can be generated from images with a lower resolution.

Figure 4A:
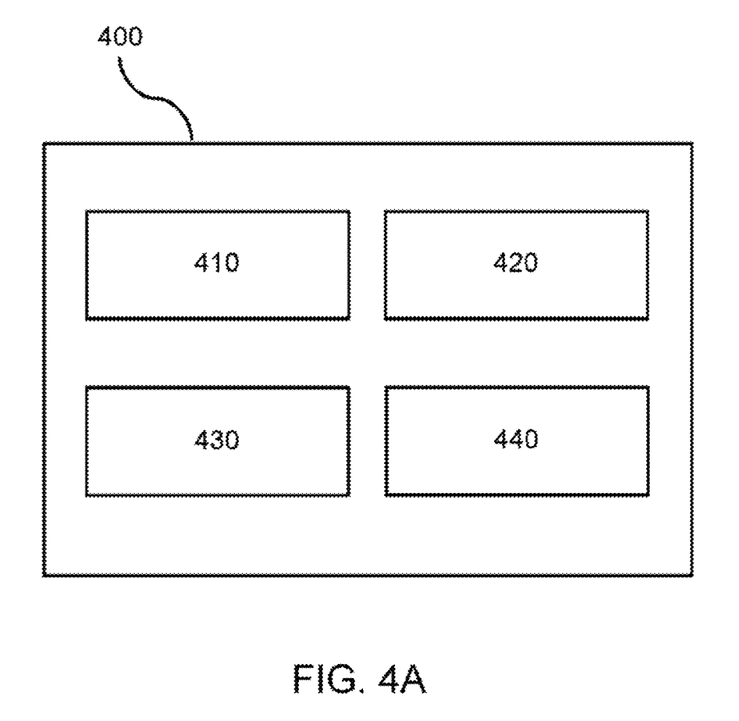
FIG. 4A shows a schematic illustration of an apparatus according to the invention according to one embodiment.

FIG. 4A shows an apparatus 400 which comprises one or more processors 410 and one or more storage media 420. The apparatus 400 can comprise an imaging and/or image recording system. Alternatively, the apparatus 400 can also be spatially separated from an imaging and/or image recording system and can be connected to the imaging and/or image recording system via a network, for example a radio network. In this case, the apparatus can comprise a personal computer, a server, a microcomputer, a computer, or an embedded computer.

The one or more processors 410 can comprise computing accelerators, such as graphical processing units (GPUs), TensorFlow processing units or tensor processing units (TPUs), application-specific integrated circuits (ASICs) specialized for machine learning (ML) and/or deep learning (DL), or field-programmable gate arrays (FPGAs) or at least one central processing unit (CPU). An application-specific integrated circuit (ASIC, also referred to as custom chip) is electronic circuitry that can be realized as an integrated circuit. Since their architecture is adapted to a specific problem, ASICs operate very efficiently and several times faster than a functionally equivalent implementation by software in a microcontroller. TPUs, also referred to as TensorFlow processors, are application-specific chips and, in comparison with CPUs, can accelerate applications within the scope of machine learning. This or similar specialized hardware can be used to optimally achieve deep learning objects. The application of a neural network, in particular, which requires orders of magnitude of less computational power than the training, i.e., the development of a model, also operates on conventional CPUs.

Furthermore, in embodiments, the apparatus can comprise one or more neural networks 430. With the aid of the one or more neural networks 430, the apparatus 400 can be rendered capable of scaling images by means of artificial intelligence (AI). The one or more images may comprise individual images, 3-D image stacks, videos, images of multidimensional time series and/or different scales. The one or more neural networks 430 can be implemented by the one or more processors 410. The implementation of neural networks 430 requires orders of magnitude of less computational power than the training or the development of a neural network.

By the implementation of the neural network 430 on the apparatus 400, the latter obtains additional "intelligence". Thus, the apparatus 400 can be put into a position to independently achieve a desired object. This consequently yields a cognitively extended apparatus 400. Cognitively extended means that the apparatus can be rendered capable of semantically identifying and processing image content or other data by the use of neural networks (e.g., deep learning models) or other machine learning methods.

Furthermore, the apparatus 400 can comprise one or more components 440. By way of example, the one or more components 440 can comprise a user interface, an interface to download neural networks on the apparatus 400 or an image capture system.

In embodiments, the apparatus 400 can be used to train a neural network 430. Computer-executable instructions stored on the one or more computer-readable storage media 420 can, when executed by the one or more processors 410, cause one of the methods or parts of the method according to FIGS. 5A and/or 5B to be carried out.

Figure 4B:
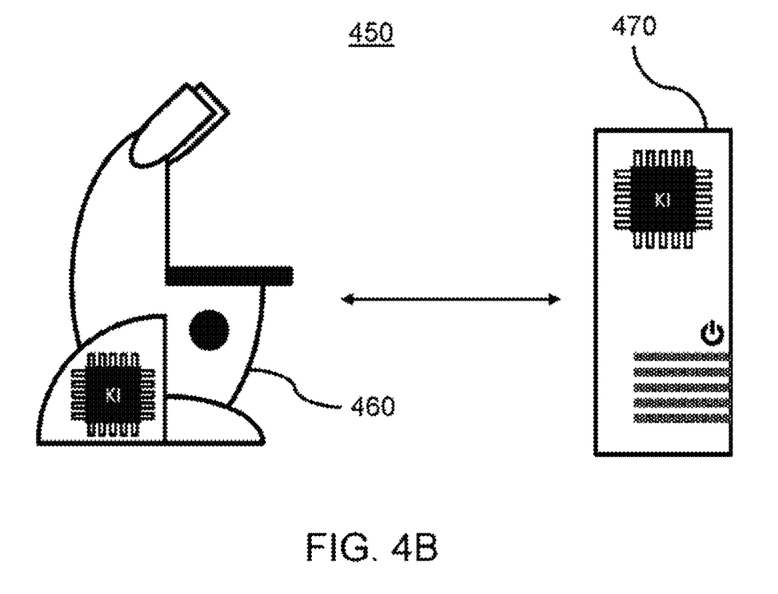
FIG. 4B shows a schematic illustration of a system according to the invention for scaling images according to one embodiment.

FIG. 4B shows a system 450 which comprises an imaging and/or image recording system 460 and a computer 470, for example a personal computer, which are connected by way of a network, for example a radio network or an optical fiber network. In embodiments, the imaging and/or image recording system 460 and/or the personal computer 470 may comprise the apparatus 400. Consequently, the image recording system 460 and/or the personal computer 470 can be configured with artificial intelligence (AI). Alternatively, the apparatus 400 can be spatially separated from the imaging and/or image recording system 460 and/or the personal computer 470 and can be connected to these via a network.

The imaging and/or image recording system 460 can comprise an optical system, such as, e.g., an objective, optical units or individual lenses, and a detection system, such as, e.g., a photographic layer, an sCMOS ("scientific complementary metal-oxide-semiconductor") or CCD ("charge-coupled device") sensor. By way of example, the imaging and/or image recording system 460 can comprise a microscope with a camera, a video camera, a microscope system, a microscope with a point scanner, a digital camera, a smartphone, a telescope, a measuring device or a computer with a camera. FIG. 4B shows an image recording system 460, only by way of example as a light microscope. Image recording system 460 can comprise all types of microscopes in embodiments. By way of example, a microscope can comprise one of the following: a light microscope, a stereo microscope, a confocal microscope, a multiphoton microscope, a STED microscope, a slit lamp microscope, a surgical microscope, a digital microscope, a USB microscope, an electron microscope, a scanning electron microscope, a mirror microscope, a fluorescence microscope, a focused ion beam (FIB) microscope, a helium ion microscope, a magnetic resonance microscope, a neutron microscope, a scanning SQUID microscope, an x-ray microscope, an ultrasound microscope, a selective plane illumination microscope (SPIM) or an acoustic microscope, etc.

FIG. 4B shows, in one embodiment, communication of an AI-enabled microscope 460 with an AI-enabled computer 470. Here, an individual image recording system itself can comprise hardware acceleration and/or a microcomputer, such as the apparatus 400, which facilitate the implementation of trained models (e.g., neural networks). Alternatively, it is also possible for only the image recording system 460 or only the computer 470 to be AI-enabled.

In embodiments, the image capture system 460 is configured to capture one or more images. The one or more captured images can be stored locally on the image capture system 460 or spatially separate from the image capture system 460. By way of example, the image capture system 460 can transmit the one or more images via a network to the personal computer 470 or to the apparatus 400, where the images are then stored. The one or more stored images can then be input into a neural network for scaling images. Alternatively, the one or more captured images can be input directly into the neural network and only the one or more corrected images are stored. This facilitates scaling of the images in real time. For a multiplicity of images or a very large data stack, upscaling can also be implemented asynchronously on a cluster in the network or in a cloud in one embodiment.

In one embodiment, the recorded images are processed on the computer 470, a software implementing a neural network able to intelligently scale the images running on said computer. Missing image information can be generated semantically correctly from hidden representations present in the neural network due to learning. Consequently, the system 450 can make recordings or carry out measurements at a higher speed and/or implement data reduction. The memory or memory bandwidth required can be reduced.

The gain in speed is based on having to record fewer image points than actually necessary in order to obtain the desired resolution. Depending on the light sensor of the image capture system it is possible to distinguish between point detectors and area detectors. In microscopy, point detectors are predominantly used in confocal laser scanning microscopes. In laser scanning methods, the image is generated by line-by-line scanning of a sample. The image recording time depends on the number of lines scanned. By way of example, if the number of lines is reduced to a quarter, the recording speed can be increased approximately fourfold. Area detectors can be used in wide field microscopy. In this case, a speed advantage may arise due to binning, i.e., combining pixels. This reduces the resolution and exposure time, increasing the recording speed.

Independently of the recording technique employed, the storage size of an uncompressed two-dimensional image is quadratically related to the resolution in each spatial direction. If the desired image content can be reconstructed by intelligent upscaling, it is possible to accordingly downscale the images before storing. In one embodiment, a neural network can be used for intelligent upscaling of images in three spatial dimensions and the time dimension, as a result of which the amount of data to be stored can be reduced. The memory saving S emerges as: $S=\beta^d$. Here, S is the factor of the memory saving in relation to the full resolution, B is the isotropic binning in each spatial direction and d is the dimension of the image. By way of example, this yields a memory reduction of S=64 in the case of a 3-D stack with an isotropic binning of $\beta=4$.

Light-sensitive samples or stains which can be photochemically decomposed by the use of a large light dose are often used in microscopy. This is also referred to as photobleaching. More pronounced binning in the case of an area detector or the pixel resolution reduced by the binning factor in the case of a point detector exposes the sample to light for a shorter time period. The effect of binning is consequently that of being able to reduce a light dose. By reducing the light dose and increasing the recording speed it is possible to reduce the effect of photobleaching and the field of application of microscopes can be increased.

If the maximum beneficial resolution is present in the recording, i.e., the pixel size is approximately two to three times smaller than the corresponding "point spread function", an increase in the number of pixels no longer leads to an increase in image information. In this boundary region, intelligent upscaling can lead to an image containing more image information. To this end, the utilized neural network or trained model may have been trained in such a way that the input images in the training data record comprise diffraction-limited images while the images present at the output of the model as a target value (target output images) show the same site or the same object recorded with an optical super-resolution process. By training, the neural network can then simulate this optical super-resolution process. By way of example, wide field microscopy can be used in embodiments in order to generate a low-resolution image as an input image for the training and confocal microscopy can be used to generate a high-resolution image as a corresponding target output image. Alternatively, a low-resolution image could be generated by confocal microscopy as an input image for training and a high-resolution image could be generated as corresponding target output image by means of "stimulated emission depletion" (STED) nanoscopy.

Figure 5A:
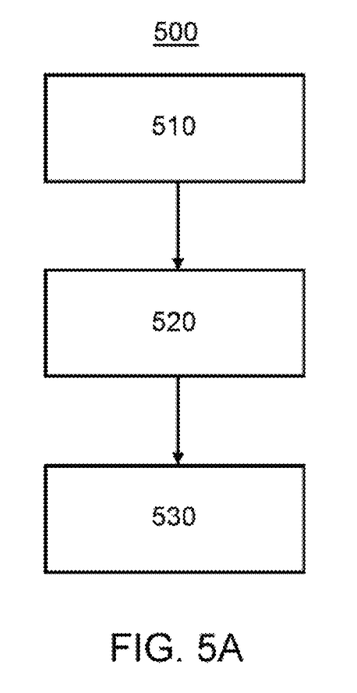
FIG. 5A shows a schematic flowchart of an embodiment of the method according to the invention for scaling images.
Figure 5B:
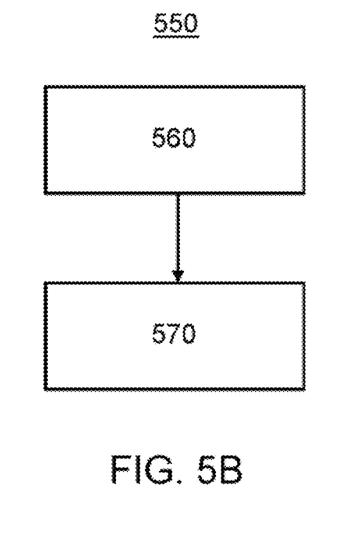
FIG. 5B shows a schematic flowchart of an embodiment of the method according to the invention for training a neural network.

FIG. 5A shows a schematic flowchart according to one exemplary embodiment of a (computer-implemented) method 500 according to the invention for scaling images. The method 500 can comprise a first step 510, in which an imaging and/or image recording system is set. By way of example, it is possible to set a resolution with which the imaging and/or image recording system records one or more images. This can be implemented by binning (combining pixels) or selecting certain pixels for a recording. Moreover, it is possible to set a frame rate for capturing the one or more first images, a transfer rate of the one or more captured first images from the imaging and/or image recording system to a computer or personal computer, the apparatus or a data memory, an exposure time, a scanning format or a pixel resolution for capturing the one or more first images, wherein the one or more first images comprise one or more scanned images, a scan frequency (e.g., a line scan frequency) of the imaging and/or image recording system, wherein the imaging and/or image recording system comprises a scanning imaging and/or image recording system, a numerical aperture, NA, of an optical system of the imaging and/or image recording system, and/or a luminous intensity of a light source of the imaging and/or image recording system. The scan frequency may be related to a speed with which a light source (for example a laser) of the imaging and/or image recording system scans an object. The scanning format can define a spatial resolution (e.g., 1024×1024 or 512×512) when scanning. The settings of the imaging and/or image recording system can be related to the resolution. By way of example, a frame rate can be increased if the resolution is reduced or the luminous intensity and/or the exposure time of a light source of the imaging and/or image recording system can be reduced by binning (reducing the resolution).

In a second step 520 one or more first images can be captured by means of an imaging and/or image recording system. The one or more captured first images are related to a first resolution.

In a third step 530 a neural network generates one or more corresponding second images on the basis of the one or more captured first images, for example in real time. The one or more second images are related to a second resolution, the first resolution differing from the second resolution. The neural network can be applied directly to each of the one or more captured first images and only the one or more second images can be stored.

In one embodiment, the neural network upscales a low-resolution image and the upscaled image is transmitted to a computer for further processing. Alternatively, the low-resolution image can be transmitted to a computer and upscaled on the computer with the aid of the neural network.

Neural networks can be trained using deep learning processes. This comprises an orderly application of at least one deep learning method, but preferably a plurality of deep learning methods, in order to achieve a certain target. In this case, the target can comprise the image processing (e.g., correction of one or more optical errors, generation of an image from another image, wherein at least one feature in the images is different, etc.). Deep learning methods can comprise a sequence of method steps which subdivide a procedure into comprehensible steps, to be precise in such a way that this procedure is rendered repeatable. The method steps can be certain deep learning algorithms. However, these can also be processes by means of which a network learns (e.g., back propagation); for example, this can be the way in which data is collected or the way in which data are processed by way of hardware, etc.

FIG. 5B shows a schematic flowchart of a computer-implemented method 550 for training a neural network for scaling images. In a first step 560 image pairs are determined as training data in order to train a neural network on the basis of these image pairs (step 570). Determining the training data or training images can comprise one or more measurements and/or one or more simulations in conjunction with one or more sample types, in order to generate the training data. Alternatively, training data stored in a database or made available by third parties can be determined for the training. The image pairs comprise input images and target output images.

Loss functions based on a per pixel loss are susceptible to errors and may supply imprecise results for training. In order to counteract these disadvantages, loss functions which determine perceptual differences and semantic differences between images can be used in embodiments. Therefore, a second neural network can be determined as a loss function for the first neural network (the neural network to be trained). By way of example, this can be implemented by training the second neural network. Alternatively, the determination of the second neural network can comprise selecting the second neural network from a multiplicity of neural networks, wherein the multiplicity of neural networks were trained using different sample types and the second neural network is selected on the basis of the sample type. The second neural network may have been trained or can be trained using a sample type which is related to the subsequent application of the first neural network. The second neural network can be configured to make predictions, such as a classification, for example, on the basis of images as an input value for the second neural network. Consequently, a perceptual loss can be determined by the loss network, with the aid of which it is possible to ensure that the output of the neural network looks like an expected image. This is not a given in the case of loss functions that only calculate an error per pixel of an image. Consequently, the output images are not treated as a set of independent pixels but are put into a semantic relationship.

In step 520, the first neural network is trained on the basis of the training data from step 510. During the training in step 520, internal parameters (e.g., weights/filters "W" and thresholds "B") of the first neural network are found, which map a multiplicity of input images input into the first neural network onto the target output images in optimal fashion or to the best possible extent. Consequently, the first neural network is able to generate new images from images and solve a problem related to the training data. The first neural network can be trained to scale images.

Moreover, the first neural network which was trained in step 520 can be finely adjusted. In this case, the first neural network is trained further in order to obtain an adapted (third) neural network. The adapted neural network can be trained for a specific application. By way of example, the first neural network can be trained further on the basis of specific training data. Consequently, the adapted (third) neural network can be specifically trained further for a specific application, by virtue of training data of a certain sample type (which have a certain relationship with the determined application) being used for the fine tuning. During the further training (fine tuning), it is possible to use these special training data in order to further train at least some of the pre-trained (first) neural network. By way of example, it is possible to only alter some of the internal parameters of the neural network on the basis of the further training, wherein the remaining internal parameters cannot be altered by the further training. This facilitates a quick individual adaptation of the neural network to a certain application, such as the upscaling of images representing a certain sample type.

Fine tuning of the neural networks allows these to be continuously improved and/or the field of application of the neural networks to be specified. Advantageously, this can be implemented by training of only a few nodes in a neural network.

Subsequently, the adapted neural network can be made available for third parties, can be applied on an apparatus, the apparatus being related to the optical system, or can be stored in a cloud, on a server, or in any other data memory.

Images with a certain resolution can be scaled with the aid of machine learning (ML) processes. The described ML processes comprise algorithms with which machines can learn from experience and may arise from so-called "deep learning" (DL), a certain type of neural network.

The neural network is trained to convert objects in a captured image into an upscaled image, in such a way that the object is correctly reconstructed "implicitly", i.e., as part of the learned parameters, in the network. The neural network may have seen similar objects during training. In this case, similar means that the same image features were present both in the training images and in the images to be scaled, i.e., the training images are contextualized with the captured images.

The apparatus according to embodiments of the invention and the method according to embodiments of the invention provide means for scaling images. The apparatus according to embodiments of the invention is configured to scale one or more captured images with the aid of a neural network. Advantageously, this can already be implemented during or directly after the capture of the images, i.e., before the image is stored ("in real time"). The image scaling is consequently part of the recording process of images.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS 110, 120, 130, 140 Images
210, 220 Images
200 Neural network
300, 310, 320 Images
330, 350 Pixel
340 Convolution matrix
400 Apparatus
410 Processor
420 Storage medium
430 Neural network
440 Components
450 System
460 Imaging and/or image recording system
470 Computer
500, 550 Method
510-530, 560, 570 Method steps

The invention claimed is:

1. An apparatus for scaling images, the apparatus comprising:
one or more processors;
one or more computer-readable storage media on which computer-executable instructions are stored, which upon being executed by the one or more processors, provide for execution of the following steps:
setting a first resolution for a microscope by setting a binning and/or selecting a subset of pixels for capturing one or more first images;
adjusting the microscope based on the first resolution, wherein adjusting the microscope comprises adjusting at least one of a numerical aperture (NA) of an optical system of the microscope, an exposure time, or a luminous intensity of a light source of the microscope;
capturing the one or more first images by the microscope, wherein the one or more captured first images have the first resolution; and
generating one or more corresponding second images by applying a neural network to the one or more captured first images, wherein the one or more second images are related to a second resolution, the first resolution is lower than the second resolution.

2. The apparatus as claimed in claim 1, wherein the neural network is directly applied to each of the one or more captured first images and only the one or more second images are stored.

3. The apparatus as claimed in claim 1, wherein, by setting the first resolution that is lower than the second resolution, the microscope is configured to:
reduce the exposure time for the capture of the one or more first images by the binning and/or selecting the subset of pixels,
reduce the luminous intensity of the light source of the microscope by the binning,
increase a transfer rate of the one or more first images by the binning and/or the selecting the subset of pixels,
increase a frame rate for capturing the one or more first images by the binning and/or the selecting the subset of pixels,
increase a maximum number of storable images by the binning and/or the selecting the subset of pixels,
increase a recording speed for capturing the one or more first images by the binning and/or the selecting the subset of pixels, and/or
store a greater number of the one or more captured first images by the binning and/or the selecting the subset of pixels.

4. The apparatus as claimed in claim 1, wherein the one or more captured first images are stored and the neural network is applied to the one or more stored first images.

5. The apparatus as claimed in claim 4, wherein the first resolution of the one or more captured first images is reduced prior to storing.

6. The apparatus as claimed in claim 1, wherein the microscope comprises a camera, a video camera, or a point scanner.

7. The apparatus as claimed in claim 1, wherein the one or more processors comprise computing accelerators including at least one of a graphical processing unit (GPU), field-programmable gate array (FPGA), tensor processing unit (TPU), application-specific integrated circuit (ASIC) specialized for machine learning and/or deep learning, or at least one central processing unit (CPU).

8. The apparatus as claimed in claim 1, wherein the neural network was trained in one context with the one or more first images and the one or more second images contain image information which was generated semantically correctly from the neural network.

9. The apparatus as claimed in claim 1, wherein the neural network was trained using image pairs, wherein input images of the image pairs were captured by a first imaging and/or image recording system and target output images of the image pairs corresponding to the input images were captured by a second imaging and/or image recording system, wherein the first imaging and/or image recording system differs from the second imaging and/or image recording system.

10. The apparatus as claimed in claim 9, wherein the second imaging and/or image recording system is configured to capture images with a higher resolution than the first imaging and/or image recording system.

11. The apparatus as claimed in claim 1, wherein the computer-executable instructions, upon being executed by the one or more processors, furthermore cause:
the one or more captured first images to be preprocessed, wherein the preprocessing comprises an interpolation of the one or more captured first images to the second resolution and the neural network is applied to the one or more interpolated first images, or
the neural network to be applied to the one or more captured first images.

12. A system for scaling images, the system comprising:
at least one of the apparatus as claimed in claim 1; and
the microscope, wherein the microscope is configured to capture the one or more first images.

\* \* \* \* \*